(12) United States Patent
Nygren

(10) Patent No.: US 6,794,894 B2
(45) Date of Patent: Sep. 21, 2004

(54) METHOD AND SYSTEM FOR BIDIRECTIONAL SIGNAL TRANSMISSION

(75) Inventor: Aaron Nygren, München (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 10/178,252

(22) Filed: Jun. 24, 2002

(65) Prior Publication Data

US 2002/0196050 A1 Dec. 26, 2002

(30) Foreign Application Priority Data

Jun. 22, 2001 (DE) .......................... 101 30 156

(51) Int. Cl.[7] .......................... H03K 19/003
(52) U.S. Cl. .................. 326/30; 326/86; 327/112; 327/108
(58) Field of Search .................. 326/30, 86, 90; 327/112, 108

(56) References Cited

U.S. PATENT DOCUMENTS

| | | | |
|---|---|---|---|
| 6,014,037 A | 1/2000 | Gabara et al. | |
| 6,194,924 B1 | 2/2001 | Welch et al. | |
| 2002/0190746 A1 * | 12/2002 | Abrosimov et al. | 326/30 |

FOREIGN PATENT DOCUMENTS

| | | |
|---|---|---|
| DE | 44 33 143 A1 | 3/1995 |
| DE | 43 42 036 C1 | 4/1995 |
| DE | 44 26 841 A1 | 6/1995 |
| EP | 0 836 302 A2 | 4/1998 |

* cited by examiner

*Primary Examiner*—Vibol Tan
(74) *Attorney, Agent, or Firm*—Laurence A. Greenberg; Werner H. Stemer; Gregory L. Mayback

(57) ABSTRACT

A system for bidirectional signal transmission of an electrical signal from a transmitter at a first location to a receiver at a second location, and from a transmitter at the second location to a receiver at the first location via a common transmission line forms, with each receiver, a line termination for matching the received electrical signal. Each transmitter is in the form of a combined transmission/termination circuit configuration which may in each case be operated in a transmission operating mode and in a reception/termination operating mode. A control circuit produces an operating mode control signal. Each transmission/termination circuit configuration is configured such that it can be switched either to the transmission operating mode or to the reception/termination operating mode depending on the operating mode control signal which is supplied from the control circuit. A method for bidirectional signal transmission of an electrical signal is also provided.

13 Claims, 1 Drawing Sheet

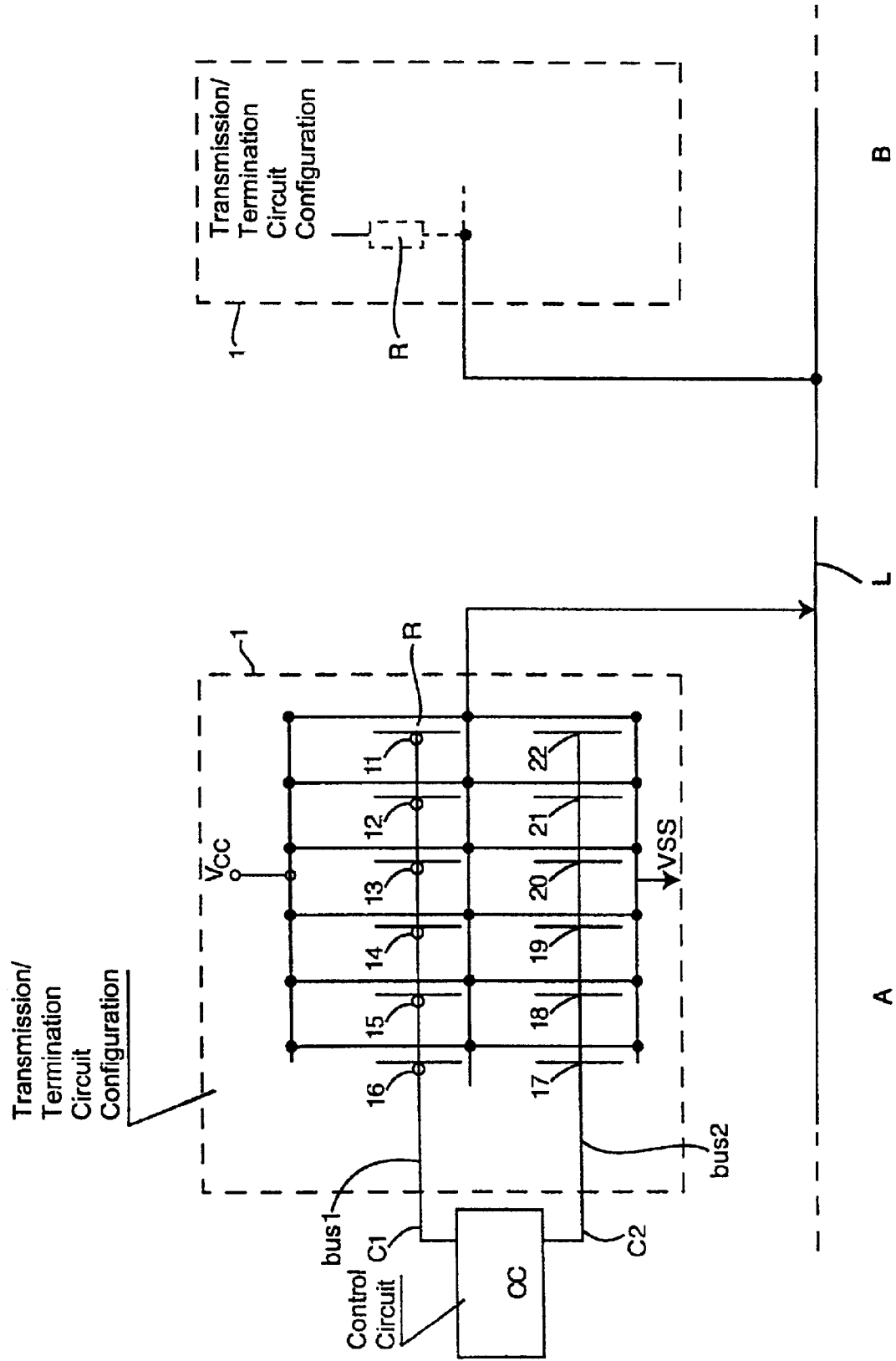

METHOD AND SYSTEM FOR BIDIRECTIONAL SIGNAL TRANSMISSION

BACKGROUND OF THE INVENTION

Field of the Invention

The invention relates to a method and a system for bidirectional signal transmission of an electrical signal from a transmitter at a first location to a receiver at a second location, and from a transmitter at the second location to a receiver at the first location via a common transmission line. Each receiver has a line termination for terminating the common transmission line and for matching the signal which is received from the common transmission line.

In conventional bidirectional signal transmission systems, the transmission drivers and the line terminations are separate circuit configurations and have mutually independent circuit functions. Each circuit configuration is connected or can be connected to the transmission line at different locations. The transmission drivers and receiver/termination circuits which are connected or can be connected through the use of the transmission line are provided in a single semiconductor chip or else are each provided in separate semiconductor chips. Furthermore, it is possible, for example, for the transmission driver to be formed on one semiconductor chip, while the termination circuit configuration is located outside that chip.

SUMMARY OF THE INVENTION

It is accordingly an object of the invention to provide a method and a system for bidirectional signal transmission which overcome the above-mentioned disadvantages of the heretofore-known methods and systems of this general type and which simplify the complexity of integrated semiconductor circuits, improve the capability to test the functionality of a bidirectional transmission system, and reduce the price of semiconductor circuits or semiconductor circuit assemblies having bidirectional transmission systems.

With the foregoing and other objects in view there is provided, in accordance with the invention, a method for bidirectional signal transmission, the method includes the steps of:

providing a transmission/termination circuit configuration at a first location and a further transmission/termination circuit configuration at a second location, the transmission/termination circuit configurations being operatively connected via a common transmission line, each of the transmission/termination circuit configurations having a transmission operating mode and a reception/termination operating mode;

supplying a respective operating mode control signal to the transmission/termination circuit configurations in order to switch between the transmission operating mode and the reception/termination operating mode; and switching the transmission/termination circuit configurations depending on the respective operating mode control signal supplied thereto such that each of the transmission/termination circuit configurations is selectively switched to the transmission operating mode for transmitting an electrical signal via the common transmission line and to the reception/termination operating mode for forming a line termination such that an electrical signal received via the common transmission line is matched with the line termination.

Another mode of the method according to the invention includes providing control circuits separate from the transmission/termination circuit configurations; and producing the respective operating mode control signal with the control circuits respectively at the first and second locations.

Yet another mode of the method according to the invention includes, producing the respective operating mode control signal with a control circuit common to all of the transmission/termination circuit configurations.

Another mode of the method according to the invention includes setting a desired terminating impedance in each of the transmission/termination circuit configurations in the reception/termination operating mode based on the respective operating mode control signal.

A further mode of the method according to the invention includes producing, with a control circuit, the operating mode control signal in a number of different discrete values; and setting a respective terminating impedance in each of the transmission/termination circuit configurations in the reception/termination operating mode such that the respective terminating impedance corresponds to a respective value of the operating mode control signal.

Another mode of the method according to the invention includes providing a plurality of impedance circuits in each of the transmission/termination circuit configurations such that the impedance circuits can be selectively connected in parallel and in series; and setting a desired terminating impedance in the reception/termination operating mode with the impedance circuits selectively connected in parallel and in series.

In other words, according to the invention, each transmission driver and each line termination for a bidirectional signal transmission method is in the form of a combined transmission/termination circuit configuration, which can be operated in two operating modes, to be precise in a transmission operating mode when the circuit configuration is acting as a transmission driver and in which it can transmit a signal via the transmission line to a receiver, or in a reception/termination operating mode, in which it receives a signal from the transmission line and provides a termination. It is possible to switch between these two operating modes of the combined transmission/termination circuit configuration through the use of an operating mode control signal which is produced by a control circuit. The control circuit may either be provided at the location of each transmission/termination circuit configuration or, instead of this, may also be formed by one control circuit, which is common to all the transmission/termination circuit configurations. In this case, the transmission line may be located on one semiconductor chip together with the transmission/termination circuit configurations, or else outside that chip. The transmission/termination circuit configuration may have a number of impedance circuits which can be connected in parallel and may have a combination of active and passive impedances.

The number of parallel-connected impedance circuits governs the value of the terminating impedance. The operating mode control signal may be supplied from the control circuit such that it determines how many or which impedance circuits are connected in parallel. The operating mode control signal thus governs not only the switching of the operating mode from the transmission operating mode to the receiver/termination operating mode but, in a corresponding manner, its value also governs the value of the respective terminating impedance.

It is clear to the person skilled in the art that a terminating impedance may have not only resistive components but also inductive and capacitive components.

The transmission/termination circuit configurations and the transmission lines may be configured such that, in principle, the transmission line may connect any desired number of transmission/termination circuit configurations.

With the objects of the invention in view there is also provided, a system for a bidirectional signal transmission of an electrical signal, including:

- a transmission/termination circuit configuration disposed at a first location and a further transmission/termination circuit configuration disposed at a second location;
- a common transmission line connecting the transmission/termination circuit configurations to one another;
- the transmission/termination circuit configurations each having a transmission operating mode for transmitting an electrical signal via the common transmission line and a reception/termination operating mode for receiving an electrical signal via the common transmission line and for providing a line termination for matching the electrical signal received via the common transmission line;
- a control circuit configuration operatively connected to at least one of the transmission/termination circuit configurations for producing an operating mode control signal; and
- the transmission/termination circuit configurations being configured to be selectively switched to the transmission operating mode and to the reception/termination operating mode depending on the operating mode control signal.

According to another feature of the invention, the control circuit configuration is embodied as a control circuit provided at the first location and a further control circuit provided at the second location.

According to another feature of the invention, the control circuit configuration is embodied as a common control circuit for the transmission/termination circuit configurations.

According to yet another feature of the invention, the transmission/termination circuit configuration and the common transmission line are jointly implemented as a semiconductor chip configuration.

According to a further feature of the invention, the transmission/termination circuit configuration is implemented as a semiconductor chip configuration; and the common transmission line is provided outside the semiconductor chip configuration.

According to another feature of the invention, the transmission/termination circuit configurations and the common transmission line are configured such that the common transmission line allows connecting any desired number of transmission/termination circuit configurations.

According to yet another feature of the invention, the transmission/termination circuit configuration includes a plurality of impedance circuits configured to be selectively connected in parallel and in series, and the operating mode control signal determining how many of the impedance circuits are selectively connected in parallel and in series.

According to another feature of the invention, the impedance circuits are identical impedance circuits.

According to a further feature of the invention, the impedance circuits each include a respective combination of active and passive impedance elements.

According to another feature of the invention, the active impedance elements are transistor circuits forming terminating impedances in the reception/termination operating mode, and forming transmission drivers in the transmission operating mode.

Other features which are considered as characteristic for the invention are set forth in the appended claims.

Although the invention is illustrated and described herein as embodied in a method and a system for bidirectional signal transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The single FIGURE a schematic block diagram for illustrating an exemplary embodiment of a bidirectional signal transmission system according to the invention.

DESCRIPTION OF THE PREFERRED EMBODIMENTS

Referring now to the single FIGURE there is shown a transmission line L which, in principle, may connect any desired number of transmission/termination circuit configurations 1. The illustration shows a first combined transmission/termination circuit configuration 1 of this type at a first location A, and a further identical combined transmission/termination circuit configuration 1 at a second location B.

A control circuit CC produces operating mode control signals C1, C2, which are supplied via bus systems bus1 and bus2 to an impedance circuit R. The impedance circuit R is provided with the supply voltages VCC and VSS and contains a number of active and passive circuits 11–22 having switchable impedance elements, and the operating mode control signals C1, C2 which are produced by the control circuit CC govern firstly the "transmission operating mode" or the "termination operating mode" and which and how many of the individual impedance circuits 11–16 are connected in parallel and/or in series in order to produce a desired terminating impedance for a signal which is received from the transmission line L. Each of the switchable impedance elements may have the same impedance or else different impedance values. The switchable impedance elements in each combination may be matched such that they have the transmission driver function or the line termination function.

By way of example, the impedance elements 15 and 16 may be matched such that they draw the transmission line L to a logic "1". On the other hand, the impedance elements 11 and 22 may be matched such that they provide a "1" termination as a parallel termination when a signal is received from the line 11.

In the transmission operating mode, the driver capacity or power is governed by the number of impedance elements which are connected in parallel and/or in series.

The integration of two functions in a single transmission/termination circuit configuration makes it possible for a circuit configuration such as this to be operated either in a transmission operating mode or in a reception/termination operating mode, depending on an operating mode control signal. The circuit layout, the functional testing of the signal transmission and the matching or setting of the respective terminating impedances are thus considerably simplified. The proposed bidirectional signal transmission system may be used both when the transmission line and the respective transmission/termination circuit configurations are located on a single semiconductor chip, for example on a semiconductor memory chip, or else when the transmission line is located outside the chip. In this case, the transmission/termination circuit configurations may each be provided on different semiconductor chips.

I claim:

1. A method for bidirectional signal transmission, the method which comprises:

providing a transmission/termination circuit configuration at a first location and a further transmission/tertflination circuit configuration at a second location, the transmission/termination circuit configurations being operatively connected via a common transmission line, each of the transmission/termination circuit configurations having a plurality of elements integrated in a single combined circuit configuration for switching together selectively between two functions, the functions being a transmission operating mode and a reception/termination operating mode;

supplying a respective operating mode control signal to the transmission/termination circuit configurations in order to switch the impedance elements between the transmission operating mode and the reception/termination operating mode; and switching the elements of the transmission/termination circuit configurations depending on the respective operating mode control signal supplied thereto such that each of the transmission/termination circuit configurations is selectively switched to the transmission operating mode for transmitting an electrical signal via the common transmission line and to the reception/termination operating mode for forming a line termination such that an electrical signal received via the common transmission line is matched with the line termination.

2. The bidirectional signal transmission method according to claim 1, which comprises;

providing control circuits separate from the transmission/termination circuit configurations; and producing the respective operating mode control signal with the control circuits respectively at the first and second locations.

3. The bidirectional signal transmission method according to claim 1, which comprises producing the respective operating mode control signal with a control circuit common to all of the transmission/termination circuit configurations.

4. The bidirectional signal transmission method according to claim 1, which comprises setting a desired terminating impedance in each of the transmission/termination circuit configurations in the reception/termination operating mode based on the respective operating mode control signal.

5. The bidirectional signal transmission method according to claim 1, which comprises:

producing, with a control circuit, the operating mode control signal in a number of different discrete values; and setting a respective terminating impedance in each of the transmission/termination circuit configurations in the reception/terTfliflation operating mode such that the respective terminating impedance corresponds to a respective value of the operating mode control signal.

6. The bidirectional signal transmission method according to claim 1, which comprises:

providing a plurality of impedance circuits in each of the transmission/termination circuit configurations such that the impedance circuits can be selectively connected in parallel and in series; and setting a desired terminating impedance in the reception/termination operating mode with the impedance circuits selectively connected in parallel and in series.

7. A system for a bidirectional signal transmission of an electrical signal, comprising:

a transmission/termination circuit configuration disposed at a first location and a further transmission/termination circuit configuration disposed at a second location;

a common transmission line connecting said transmission!termination circuit configurations to one another;

said transmission/termination circuit configurations each having a plurality of elements integrated in a single combined circuit configuration for switching together between two functions, said functions being a transmission operating mode for transmitting an electrical signal via said common transmission line and a reception/termination operating mode for receiving an electrical signal via said common transmission line and for providing a line termination for matching the electrical signal received via said common transmission line;

a control circuit configuration operatively connected to at least one of said transmission/termination circuit configurations for producing an operating mode control signal; and said elements of said transmission/termiflation circuit configurations being configured to be selectively switched to the transmission operating mode and to the reception/termination operating mode depending on the operating mode control signal.

8. The signal transmission system according to claim 7, wherein said control circuit configuration is embodied as a control circuit provided at the first location and a further control circuit provided at the second location.

9. The signal transmission system according to claim 7, wherein said control circuit configuration is commonly embodied for all of said transmission/termination circuit configurations.

10. The signal transmission system according to claim 7, wherein said transmission/termination circuit configuration is implemented as a semiconductor chip configuration; and said common transmission line is provided outside said semiconductor chip configuration.

11. The signal transmission system according to claim 7, wherein said transmission/termination circuit configuration includes a plurality of impedance circuits configured to be selectively connected in parallel and in series, and the operating mode control signal determining how many of said impedance circuits are selectively connected in parallel and in series.

12. The signal transmission system according to claim 11, wherein said impedance circuits are identical impedance circuits.

13. The signal transmission system according to claim 11, wherein said impedance elements are transistor circuits forming terminating impedances in the reception/termination operating mode, and forming transmission drivers in the transmission operating mode.

* * * * *